Patented Oct. 6, 1936

2,056,457

UNITED STATES PATENT OFFICE 2,056,457

COMPOSITE ARTICLE AND METHOD OF MAKING

Arthur M. Howald, Pittsburgh, Pa., assignor, by mesne assignments, to Plaskon Company, Incorporated, a corporation of Delaware No Drawing. Application December 24, 1931, Serial No. 583,154

14 Claims. (Cl. 18—55)

This invention relates to composite articles and methods of making; and it comprises a composite plate, panel or stamped shallow article composed of an impervious, water-resistant integral body of resin derived from formaldehyde and urea in about the molecular proportion of 1.5:1, bonded to a contained, integrally united body of open textured woven or felted fiber, such as pulp board; and it further comprises partially neutralizing commercial, somewhat acid formaldehyde solution, dissolving urea therein in about the proportion of one molecule to 1.5 molecule of formaldehyde, maintaining the mixture at a temperature between 20° and 30° C. for four to 15 hours, cooling being used when necessary, impregnating open textured sheets or articles of wood fiber or the like with the resulting thin liquid in the amount that can be held by capillarity, drying in a current of air and finally submitting the dried article to heat and pressure to close the voids and compact the article, producing an infusible continuous body of resin; the article being sometimes flat and sometimes being otherwise shaped while wet, or during heating, by the use of suitably contoured pressing members; all as more fully hereinafter set forth and as claimed.

This application is a continuation in part of my prior application Serial No. 494,693. In that application I describe and claim methods of making improved fiber-containing molding compositions of formaldehyde-urea products, adaptable for hot pressing methods, wherein thin mobile liquids or solutions of initial formaldehyde-urea reaction products are prepared, absorbent fibrous material is impregnated with such liquids and the moist impregnated fiber dried at temperatures insufficient to resinify the formaldehyde-urea reaction products thus producing molding compositions comprising said fibrous materials impregnated with a potential resin. Specifically I have described and claimed molding powders so made, the dry impregnated material being ground to a powder. In making such molding powders, loose absorbent fibers may be advantageously employed to facilitate the production of pop-corn like masses easily reducible to a powder by grinding.

The present invention is directed to the manufacture of composite molded articles from such molding compositions containing absorbent fibers uniformly impregnated with said potential resins wherein the molded article obtained comprises a continuum of formaldehyde-urea resin containing a body of felted fiber as a reenforcement thereof. In the present processes, a body of felted absorbent fiber, rather than loose fiber, is employed to absorb or take up the said thinly mobile liquids. In this way, more or less preshaped or pre-formed molding blanks can be directly obtained; pre-forms which after drying may be converted into the final molded articles by compacting under suitable heat and pressure, sometimes, even, by mere hot stamping. The heat and pressure should be sufficient to fuse or soften the potential resin, compact the blank and then resinify the formaldehyde-urea product. While the molar ratio of 1.5:1 mentioned ante is advantageous, it may be varied somewhat within the range from 1.55:1 to 1.05:1 as disclosed in my said copending application Serial No. 494,693. Any of the thin mobile solutions prepared by the various methods described in my prior application may be here employed for impregnating sheets or blanks of felted absorbent fibers as set forth post.

An object attained in the present invention is the provision of a simple, direct and economical way of manufacturing high grade articles, flat or contoured and of neat and decorative appearance, from flat stock by hot pressing or stamping. By high grade articles, I mean those of material sufficiently impervious and resistant to withstand, as an accelerated test, the action of boiling water for half an hour. The flat stock is made from urea, formaldehyde and ordinary sulfite pulp board or any other sheeted, open textured, fibrous material. The urea and formaldehyde are combined and used in such a way as to avoid waste of either. Scrap and trimmings of flat stock made in cutting blanks to shape and dimensions are not wasted, being utilized in various ways, as in making molding powder.

Instead of urea, I can use the substituted ureas, such as thiourea, phenylurea, methylurea, etc., but they are more expensive than ordinary urea and their use offers no great advantage in the present process. Similarly, while other aldehydes, such as acetaldehyde furfural, etc., and other forms of formaldehyde, such as paraform, etc., can be used in lieu of ordinary 30-40 per cent commercial formaldehyde solution, the advantage is not commensurate with the expense.

Clean urea of the fertilizer grade, commercial formaldehyde and ordinary one-eighth inch sulfite pulp board are the only materials necessary for satisfactory operation. No special apparatus is required other than a hot pressing or stamping equipment.

It is possible within the present invention to make a laminated flat stock in continuous operation, traveling webs of paper being treated and assembled to make a stock of any desired thickness; but this, again, is ordinarily hardly worth while. I do, however, sometimes in attaining special decorative effects, overlay a pulp board base with a decorative layer of thin paper treated according to this invention.

In the prior art, excellent articles of formaldehyde-urea resins, with or without a filler, have occasionally been produced, but most of the known methods of manufacture lack certainty of operation. In the presence of any acid, formaldehyde and urea in aqueous solution react violently. Even the slight acidity of commercial formaldehyde, which is often at a pH of about 3, suffices with warm materials to initiate a self-accelerating action which brings the liquid to a boil. The results vary with conditions. The maximum amount of formaldehyde with which urea will react is in the molecular proportion 2:1; and in order to restrain the formation of precipitates or hard gels having a less ratio of formaldehyde, it is the custom to use more formaldehyde than corresponds to 2:1; the proportions being sometimes as high as 4:1. The excess must be disposed of in some way prior to producing the final resins.

Many methods of making formaldehyde-urea resins have been proposed looking toward a greater certainty of operation; but in all cases the initial reaction between the two bodies is performed in aqueous solution; the water being afterwards, removed in some way. Chemical reaction is usually nearly completed in this initial action. In the earliest method, the initial reaction liquid is boiled down, allowed to gel and the gel baked to remove residual water and formaldehyde. Sometimes this method gives clear, hard, colorless, glossy resins of much merit; but not always, even with laboratory control of conditions. In other methods, conversion of the reaction products into dry materials which can be used in molding powders has been proposed; but these propositions have not produced high grade molded articles as a matter of factory routine.

As stated, the initial reaction is always in aqueous solution and even where a precipitate is not produced and the liquid remains glass clear, a result much sought, it is always viscous and gummy. The reaction in aqueous solution has gone too far; there is but little reactivity left to be utilized in making solid articles. The use of these viscous liquids for coating hats, etc., has been proposed and is practicable, since a thin film exposed to air in time will lose water and formaldehyde and set. But the liquids are too gummy to be used for impregnating fiber and, as a matter of fact, it is often difficult to admix ordinary fillers. These gummy liquids do not really impregnate fiber in the sense that the solids suspended in the liquid enter the capillaries of the fiber; instead colloidally suspended resinous matter is more or less filtered out merely coating the surface of the fiber.

Part of this gumminess I ascribe to the use of high reaction temperatures (usually around 100° C.), producing a far going reaction; producing polymerization and formation of colloid suspensions of resinous formaldehyde-urea products. At all events, I have discovered that, by keeping the temperature of a solution of urea in aqueous formaldehyde down within the range of 20° to 30° C., I can effect a slow but complete reaction of urea, without developing polymerization sufficient to make the final liquid product viscous or gummy. The action is limited to this extent. In fact, using the ordinary 30 to 40 per cent commercial formaldehyde solutions and urea, I can produce reaction liquids which, in spite of a 40 to 50 per cent content of solids, are thin enough to be filtered and which readily enter capillaries. They are not resinous in character, though the contained solids can be, and are, resinified later. They are therefore well adapted for impregnating porous materials; a fact which forms the basis of the present invention since after entrance they can be polymerized in situ to make a resinified more or less glassy continuum. In obtaining these thin liquids, it is neither necessary nor desirable to use the ordinary high formaldehyde ratios, 2:1, or more. In fact, I can and do use a ratio of 1.5:1 in making the initial liquid product, since this ratio I find highly desirable in the final finished resins to be prepared from it. With this ratio, the final resins constituting the bond or continuum of the heat-treated article, can be made containing neither free urea nor free formaldehyde and having a maximum of stability. And there is no question of adding too much formaldehyde in the beginning and then getting rid of the excess; a stumbling block in the art.

In securing the slow, regular, gentle and complete but limited action I desire, acidity must be controlled within certain limits. In the ordinary methods, the presence of an excess of formaldehyde restrains the action of acid to a large extent; and without this excess, regulation of acidity becomes important. Commercial formaldehyde usually contains enough formic acid to give it a pH of 3 and at this or any greater acidity, with warm formaldehyde solution containing dissolved urea, the reaction tends to become violent and self-accelerating; the liquid generally goes to a boiling temperature. In the absence of more formaldehyde than corresponds to a 2:1 ratio, the boiling mixture may set to a hard spongy solid or deposit a precipitate, according to conditions. This is one of the reasons for the general use of high formaldehyde ratios.

In using the 1.5:1 ratio, I find that with an acidity near the neutral point, say pH 6.4, no violent action takes place in the temperature range 20° to 30° C. and the mixture heats only slightly. But action takes a long time; 10 to 15 hours usually. With such an acidity, it is often convenient to let the mixture stand over night. At an acidity of pH 6 with a mixture at room temperature, reaction is somewhat quicker and more than slight cooling is seldom required. At pH 5 cooling is used in the first hour or so of action operating at ordinary room temperatures. At pH 4 careful control of the temperature is needed and energetic chilling is generally necessary to rapidly dissipate heat from the reaction.

Commercial formaldehyde solution is, as stated, around pH 3 and I find it ordinarily necessary to partially neutralize it. Without this partial neutralization, reaction and development of heat become inconveniently rapid. In neutralization, I usually employ triethanolamine; but any convenient base, such as soda, potash, lime, etc., can be used. In the small amount required to change the pH value, the particular neutralizing agent used is not vital.

In dissolving, urea exercises an energetic chilling action and in making large batches by adding urea to formaldehyde solution, the temperature may go down nearly to zero centigrade. In making up such a batch, it is usually warmed somewhat; enough to bring it back to room temperature. After this, it is let alone or cooled, according to the pH value of the formaldehyde. In any case, care is taken that the temperature does not go above 35° C. until reaction is over. A temperature above 35° C. gives greater viscosity than is desired in the present invention; and a temperature kept between 25 and 30° C. at all times prior to completion of the reaction in aqueous solution, gives the best mobility.

The progress of the reaction may be followed by testing for free formaldehyde in any of the usual ways. When the aldehyde content ceases to diminish the liquid is still thin and mobile and is ready for use as an impregnant. In the present invention this liquid is generally directly taken up in a body of open texture woven or felted fiber such as pulp board; and is then dried in place. Drying is at a low temperature and the initial reaction in the aqueous solution does not go forward beyond a certain point; the course of reaction is, so to speak, arrested by the drying. When the dried board is subjected to heat and pressure reaction is completed. Polymerization and other changes occur which produce a solid resinous continuum. The water soluble solids in the thin liquids are not resinous; they are at most potential resins. Instead of using the initial thin liquid directly as an impregnant it may be spray dried to give a dry soluble preparation; a solution of which can be used in the same way as the initial liquid.

On gradually heating the dry solid preparation, either that made by spray drying or that contained in the pores of the pulp board, etc., it softens and becomes plastic and then flows to shape. This thermoplastic product at a temperature around 120° sets to a hard, infusible, insoluble glassy resin of perfectly permanent character. The setting is always comparatively quick, but becomes much quicker in the presence of acidity greater than pH 6. With slow heating in the open air, degenerative changes may take place and the resin is not so good; but heating under pressure with the ordinary molding technique, good results are secured.

As will be noted, reaction is in two stages, a first stage where bodies are formed giving a thin mobile aqueous liquid without substantial polymerization and a second stage, after the water is removed, where reaction is completed; where polymerization is produced and resins result.

The greater the acidity of the liquid, the easier is the drying of porous preparations containing it and the quicker is the setting or curing of the dry product under heat in forming the final resins. Sometimes, this quicker setting is wanted and sometimes, not.

Using commercial formaldehyde solutions of 30 to 40 percent concentration and the amount of urea necessary to give the stated 1.5:1 ratio, the thin liquid formed after completion of reaction is quite concentrated. It runs 40 to 60 per cent total solids. In any utilization of the liquid product, it is necessary to remove the water with substantial completeness before it becomes gummy and thick. As stated, this can be done by spray-drying, but in the present invention, it is ordinarily done, as stated, in another way: by taking up the liquid with a sheet or article of paper pulp and drying the impregnated pulp in a current of air. The air may be warm, but the temperature of the material being dried should not go over 80° C. In another and copending application, Serial No. 494,693, wherewith the present application contains certain matter in common, I have described and claimed the production of a molding powder utilizing the facts as so far recited. In this copending application, loose paper pulp fiber is saturated with the thin liquid in the amount which it will hold without dripping and is then dried in a current of air to give loose agglomerated material. This is recomminuted to form a molding powder which can be set under heat and pressure; pressure being used of the order of 2000 pounds and the setting temperature being around 120° C.

In the present methods I may utilize any of the thin mobile solutions prepared according to the procedure described in the said prior application. That is, any of the thin mobile liquids made by reacting formaldehyde with urea in molecular proportions between 1.55:1 and 1.05:1, under the stated conditions, may be likewise employed to impregnate absorbent fillers, the impregnated mass being further processed as before to obtain dry molding compositions adaptable to shaping by hot pressing.

In the present invention, I do the same things, save that I use paper pulp in the form of a plate, or slab, or preformed article. Paper board of about ¼ inch thickness is a convenient material. This paper board I saturate with the thin liquid and dry as before. Shapes may be cut from the pulp before impregnation or after drying.

In making panels and stamped articles, pulp board may be cut to the right dimensions, impregnated and roughly contoured while wet. The wet articles are dried, as stated, in a current of air and are then hot pressed under such pressure as may be deemed desirable, but at a temperature rising to 120° C. Shape may be given in the pressing by suitably contouring the press head. It is convenient to rough shape articles while the pulp is wet and complete the shaping in the hot pressing.

Under the influence of heat and pressure, the solid condensation products of the dried solution fuse and fill the voids and then polymerize to form infusible, insoluble material. These actions are successive and while the total time required is very short with ordinary mold pressures there is sufficient flow to fill the mold prior to the setting stage. Articles made under the present invention withstand 30 minutes exposure to boiling water without damage. Thus in the present methods I produce hot pressed articles which primarily differ from those obtained in my acknowledged prior processes in that here the the felted fiber serves as a reenforcement for the resin continuum formed in situ, in and on the fibres, during the hot pressing. In some cases the hot pressing is substantially a compacting and welding of the pre-shaped impregnated composition, the filtered fibers retaining their original mutual relation to each other.

In hot pressing thick articles, a slightly longer time is required to give penetration of heat; and for relatively thick articles, a pH of 6.4 in the original reaction is best. For thinner sheets, a pH of 6 or even 5.5 gives a quick setting and also a quicker drying.

The liquid reaction product may be dyed by any convenient dye not affected by formaldehyde. The solution being white and colorless, true colors may be obtained. With a good grade of clean urea, filtration of the solution is not ordinarily necessary for the present purposes. If, however, for any reason a glass clear solution is wanted, the reaction product may be filtered in the ordinary ways and by ordinary means. With dirty urea, sometimes it is desirable to filter before effecting reaction.

Where sheeted fiber is impregnated and dried before cutting out shapes, the scrap and trimmings are useful in producing the molding powder of my copending application. In so doing, I comminute the scrap to furnish a fine powder and, ordinarily, at this time introduce something which will produce a little acid in the mold and give quicker setting. Phthalic acid resins containing an excess of phthalic anhydrid in solid solution, betabromhydrocinnamic acid, benzoyl peroxid, etc., are useful for this purpose. Some zinc stearate as a lubricant is also a useful addition. Or, impregnated scrap may be repulped, shaped, redried and hot pressed.

Where the shapes are first cut and then impregnated, the scrap of unimpregnated paper board may be used to furnish fiber for making molding powder according to my copending application.

In a specific embodiment of the present invention making a white flat 4 x 5 panel for a scale housing, commercial ¼ inch sulfite pulp board is cut to size and the 4 x 5 sheets dipped in an impregnating bath, removed and allowed to drain. This bath is made by dissolving 320 pounds of urea in 650 pounds of 37 per cent formaldehyde solution brought to 6.4 pH with triethanolamine. The cold solution is warmed to 25° C. and allowed to stand over night before use. This solution used with pulp board in the amount which will be held by capillarity will give about 60 per cent resin and 40 per cent fiber in the final hot pressed article.

The drained impregnated panels are next dried in a current of hot or warm air, care being taken to avoid a temperature over 80° C. in the material. Air at that or a less temperature should be used in finishing the drying, when the evolution of water vapor slackens.

The dried panels are then hot pressed, using a press head heated to 140° C. and a pressing time of 180 seconds. Under the heat and pressure, the reaction product softens or liquefies and flows, allowing complete obliteration of voids, and then sets to a hard, glassy, infusible, insoluble, permanent resin. With white fiber and undyed impregnant, the general appearance of the panel is that of white porcelain; a surface film of transparent resin giving the effect of a glaze.

Handsome tableware may be made by impregnating good quality commercial pulpboard plates and saucers, drying and hot pressing.

The felted relation of the fibers in pulpboard has a double function in the present invention. In the drying stage, the open texture which is much like that of blotting paper, permits the absorbed liquid to present a relatively enormous total film area to freely entering air, giving rapid and complete drying. The better the drying the better the results in hot pressing. In the pressed article, the felted fibers preserve their original relation and original length, giving an unusually effective reinforcement against strains from any direction. The incorporated body of fibers gives articles under the present invention a rugged nature; making them proof against cracking and shattering. Mechanically, they are high grade.

What I claim is:

1. In the manufacture of improved stable pressure-shaped heat-set molded articles resistant to boiling water and to shock, having the appearance of glazed porcelain and composed of a resin continuum containing a reenforcing body of prefelted fiber, the improved process which comprises hot pressing a substantially dry molding composition comprising a felted body of paper pulp uniformly impregnated and saturated with an arrested initial reaction product of formaldehyde and urea, to produce said molded article, said body of paper pulp being a preshaped and formed body, said arrested initial reaction product being a potential resin having formaldehyde and urea residues combined in a molar ratio between 1.05:1 and 1.55:1, being an arrested, low temperature, acid-condensed initial reaction product of formaldehyde and urea in said ratio, being soluble, fusible and substantially free of volatiles, and said potential resin further being capable of heat hardening without substantial liberation of volatiles at temperatures around 140° C. and being in said molding composition capable, when under a temperature around 140° C. and a pressure of one ton per square inch, of flowing sufficiently to become compacted and dense prior to heat setting, said molded article being resistant to the action of boiling water for one-half hour without deterioration.

2. The process of claim 1 wherein said potential resin and the resin formed from it have formaldehyde and urea residues fixedly combined in a molar ratio of 1.5:1.

3. In the manufacture of porcelain-like articles resistant to shock and to boiling water, the improved process which comprises preparing an unheated, partially neutralized solution of formaldehyde and urea in about the molecular proportions 1.5:1, allowing the mixture to stand in an unheated state for reaction to take place until the urea is combined and until a thin mobile solution free of gumminess is obtained, impregnating an article of felted fiber with such slightly acid solution prior to the development of resinous character therein, drawing off excess solution, drying the slightly acid impregnated article at low temperatures insufficient to resinify the formaldehyde-urea reaction product and hot pressing to produce an integral body of heat-hardened resin containing the fiber.

4. As an improvement in the manufacture of shaped, hardened and rigid articles from urea and formaldehyde, the improvement which comprises first preparing a thin, mobile solution of fusible non-resinous urea-formaldehyde reaction products by adjusting the pH value of an aqueous formaldehyde solution to between pH 5 and 7, dissolving in said formaldehyde solution sufficient urea to give a molar ratio of formaldehyde to urea of approximately 1.5:1, maintaining the solution thus obtained at temperatures not exceeding 35° C. until reaction occurs and a thin, mobile solution capable of being filtered and of readily entering capillaries is obtained and then impregnating a relatively thick, absorbent textured shaped mass of felted fibers with sufficient of said mobile solution of reaction product to associate a substantial amount of non-resinous urea-formaldehyde reaction products with and into said fibers, drying the impregnated mass at temperatures not exceeding 80° C. to secure a dryness sufficient to enable the dry mass to be hot pressed without vesiculating and, finally, hot pressing the dry mass to compact it and to fuse and resinify the urea-formaldehyde product into a continuum wherein the molar ratio of formaldehyde to urea persists.

5. In the manufacture of shaped, heat-hardened articles, having a continuum of stable resistant formaldehyde-urea resin reenforced with a body of pre-felted fiber impregnated and bonded with said resin, the improved process which comprises impregnating a pre-formed, pre-shaped, felted body of fiber with a thin mobile liquid capable of entering capillaries, said liquid comprising a slightly acid aqueous solution having an acidity less than that corresponding to pH 3 and containing dissolved therein a non-resinous formaldehyde reaction product, the molar ratio of formaldehyde to urea being 1.5:1, drying the impregnated body thus obtained in a current of warm air until substantially free of volatiles to produce a fusible heat-hardening formaldehyde-urea condensation product having formaldehyde combined with urea in a molar ratio of 1.5:1, and then molding the dried impregnated body thus obtained, under sufficient heat and pressure to produce the final shaped article and to flow and heat-harden the formaldehyde-urea product into a continuum of stable, infusible resin, thus forming an integral body of resin containing the felted fiber.

6. In the manufacture of shaped, heat-hardened articles, having a continuum of stable resistant formaldehyde-urea resin reenforced with a body of prefelted fiber impregnated and bonded with said resin, the improved process which comprises impregnating an open-textured felted body of fiber with a thin mobile, non-gummy liquid capable of entering capillaries, said liquid being a slightly acid aqueous solution having an acidity not greater than pH 4 and containing dissolved therein a non-resinous formaldehyde-urea reaction product, the molar ratio of formaldehyde to urea being 1.5:1, shaping the moist impregnated body thus obtained to give a roughly shaped article, drying the roughly shaped article thus formed, at a low temperature, said temperature being sufficient to remove volatile substances without resinifying the formaldehyde-urea product and then compacting the dried volatile-free body impregnated with a fusible heat-hardening formaldehyde-urea condensation product so obtained, under heat and pressure, the heat and pressure during pressing being sufficient to flow and then resinify the said fusible condensation product.

7. In the manufacture of stable, pressure-shaped, heat-set shaped articles having a continuum of stable, resistant, formaldehyde-urea resin reenforced with a body of pre-felted fiber impregnated and bonded with said resin, the steps which comprise mixing together formaldehyde and urea in slightly acid solution, the molecular proportion of formaldehyde to urea being between 1.05:1 and 1.55:1 and the acidity of the mixture being between 5 and 6 pH, maintaining the mixture at a relatively low temperature not exceeding 35° C. until all the urea has combined with formaldehyde and a thin mobile solution capable of entering capillaries and containing an initial water-soluble reaction product is formed, impregnating a pre-felted body of absorbent fibrous filler with the thin mobile non-gummy solution so obtained, to form a moist impregnated, pre-felted fibrous body, and then arresting the reaction short of the resinous stage, by evaporating off the contained water from the slightly acid moist body so produced, at a temperature not exceeding 80° C. to recover a dry body of pre-felted fiber, impregnated with a potential resin having formaldehyde combined with urea in said ratios and capable of being molded under heat and pressure at a temperature of 140° C. and a pressure of 1 ton per square inch without substantial liberation of volatiles sufficient to cause vesiculation and blistering.

8. The process of claim 7 wherein the said dry body of pre-felted fiber impregnated with said potential resin, is hot pressed to produce the final shaping and to resinify the potential resin in situ, subsequent to said shaping, the temperature and pressure being sufficient to soften, flow and heat-harden the said potential resin in that order, converting it into an insoluble, infusible, sound, stable, resistant resinous body.

9. An improved stable molded article resistant to boiling water and to shock and having the appearance of glazed porcelain, said article being a pressure-shaped, heat-set product comprising as a continuum, an impervious integral body of stable, resistant formaldehyde-urea resin containing a reenforcing body of pre-felted fiber, said molded article being resistant to the action of boiling water for one-half hour without deterioration, said felted fiber being uniformly impregnated with and bonded together by said resin continuum and serving as a substantial reenforcement thereof, and said resin being insoluble and infusible and having formaldehyde combined with urea in a molar ratio between 1.55:1 and 1.05:1, with all the formaldehyde fixedly combined therewith.

10. The product of claim 9 wherein said ratio of formaldehyde to urea is 1.5:1.

11. The product of claim 9 wherein said molded article is a dish for table use.

12. The product of claim 9 wherein said molded article is a panel for housing apparatus.

13. The article of claim 9 wherein said pre-felted fiber is uniformly distributed throughout said resin continuum and is itself a substantially continuous reenforcement.

14. The article of claim 9 wherein the felted fibers of said pre-felted body thereof have substantially their original mutual relation to each other as in the pre-shaped molding composition and the proportion of said reenforcement to said resin continuum is substantially the same at all points in the said molded article.

ARTHUR M. HOWALD.